April 26, 1966   G. E. WILKES   3,247,598
VARIABLE HEIGHT BLOCK GAUGE
Filed Sept. 23, 1963   2 Sheets-Sheet 1

INVENTOR.
GLENN E. WILKES
BY
LeRoy J. Leishman
AGENT

April 26, 1966     G. E. WILKES     3,247,598
VARIABLE HEIGHT BLOCK GAUGE
Filed Sept. 23, 1963     2 Sheets-Sheet 2
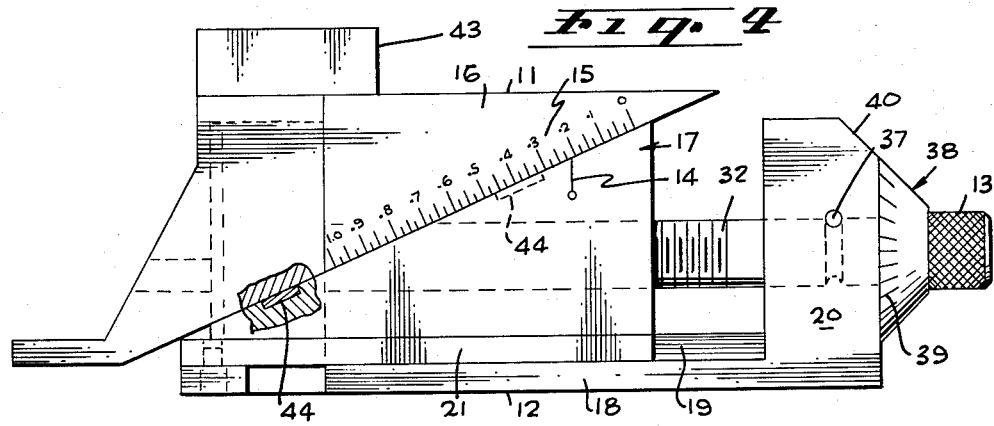
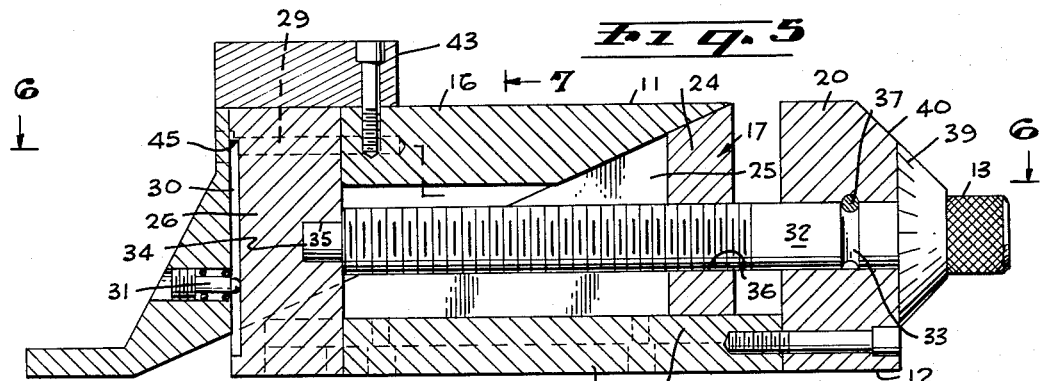
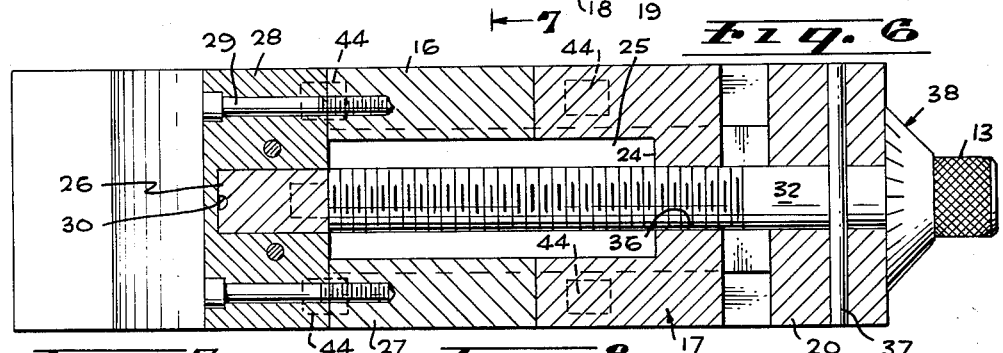
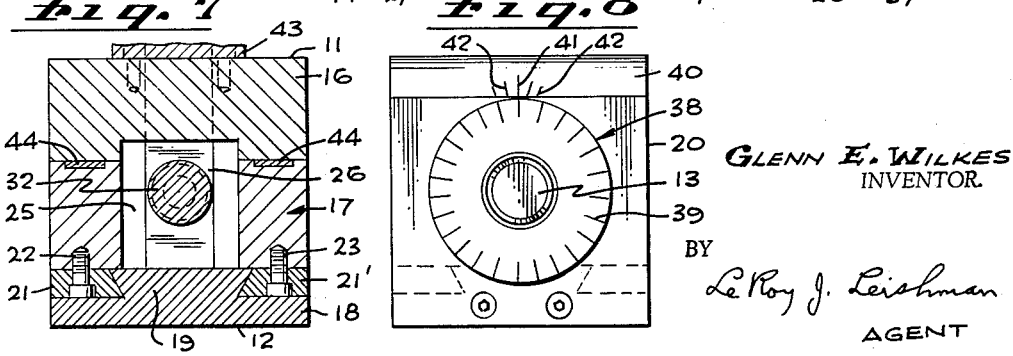
GLENN E. WILKES
INVENTOR.
BY
LeRoy J. Leishman
AGENT United States Patent Office 3,247,598
Patented Apr. 26, 1966

3,247,598
VARIABLE HEIGHT BLOCK GAUGE
Glenn E. Wilkes, Gardena, Calif.
(4460 W. 135th St., Hawthorne, Calif.)
Filed Sept. 23, 1963, Ser. No. 310,813
5 Claims. (Cl. 33—162)

This invention pertains to precision block gauges and more particularly to such a gauge that can be adjusted in height.

Precision gauge blocks, such as Johansson blocks, have long been in wide use by mechanics and tool makers. They are available in standard sizes that make it possible to stack them on top of each other or at the side of each other in order to establish a precise desired distance between the outside surfaces of the blocks that are on opposite ends of the stack or group. Inasmuch as these blocks are of course available only in standard thicknesses, it sometime becomes necessary to use a considerable number of them to make up the overall height or length desired, and this overall height or length must be supplemented by other types of gauges if the final dimension desired is not a multiple of the thickness of the thinnest available block. Accordingly, a large amount of time is spent in assembling a group of blocks that approximate the desired ultimate dimension. The principal object of the present invention is to avoid these difficulties by providing a precision block that is variable in one of its overall dimensions, this variable dimension usually being its height.

Another object is to provide an adjustable block of the type described in which all points on the top surface will move vertically in a straight line with respect to corresponding points on the bottom surface of the adjustable block.

A further object is the provision of a variable height block of the type described that may readily be adjusted to a predetermined height without the use of external measuring means.

An additional object is to provide adjusting means for a device of the type described in which the overall height of the gauge is adjusted by means of a screw whose axis of rotation is parallel to the upper and lower surfaces of the gauge.

Still another object is the provision of rotary adjusting means having a calibrated dial affixed thereto, the calibrations on said dial having substantially the same angular spacing as those on a standard micrometer.

An additional object subsidiary to the last mentioned object is to provide a rotary adjusting member in the form of a male threaded lead screw of such pitch that the height of the block will bear the same relationship to the angular movement of the dial that the spacing between the calipering members of a standard micrometer bears to the calibrations on the thimble of such micrometer.

Another object is to secure a variable spacing between the lower surface of the gauge and its upper surface by providing the upper surface on a wedge shaped member constrained to move only vertically and having an inclined lower surface that contacts the inclined upper surface of a complementary wedge-shaped member having a lower surface that is parallel to the base of the gauge and to the upper surface of the first mentioned wedge-shaped member, the complementary wedge-shaped member being constrained to move horizontally upon rotation of a screw.

A further object is to provide such inclined surfaces on the horizontally movable member and on the member that comprises the upper surface of the gauge that the upper and lower surfaces of the gauge will at all times remain parallel within the tolerances usually required of Johansson blocks.

An additional object is to provide magnetic means for holding the inclined surfaces of the complementary wedge-shaped members in such intimate contact that the uppermost of the two wedge-shaped members will move down smoothly when the horizontally movable wedge-shaped member is moved in such direction that the overall height of the gauge will be reduced.

Still another object is to provide calibrations on the side of one of the complementary wedge-shaped members and an indicating means on the other, and to provide such spacing for the calibrations that they will not only indicate the overall height of the gauge but will bear a definite relationship to the calibrations on the dial of the rotary adjusting means.

This invention possesses many other advantages, and has other objects which may be made more clearly apparent from a consideration of an illustrative embodiment of the invention. For this purpose, such an embodiment is shown in the drawings accompanying and forming a part of the present specification. This embodiment will now be described in detail, illustrating the general principles of the invention; but it is to be understood that this detailed description is not to be taken in a limiting sense, since the scope of the invention is best defined by the appended claims.

In the drawings:

FIG. 4 is a side elevation similar to FIG. 2, but showing the gauge partially expanded and partly broken away to reveal a portion of the internal construction;

FIG. 5 is a longitudinal section through the gauge in the fully collapsed position, but with the rotatable part of the structure shown intact;

FIG. 6 is a section taken generally on line 6—6 of FIG. 5;

FIG. 7 is a section taken on line 7—7 of FIG. 5; and

FIG. 8 is a right end view of the gauge with certain internal parts shown in phantom.

Figure 1:
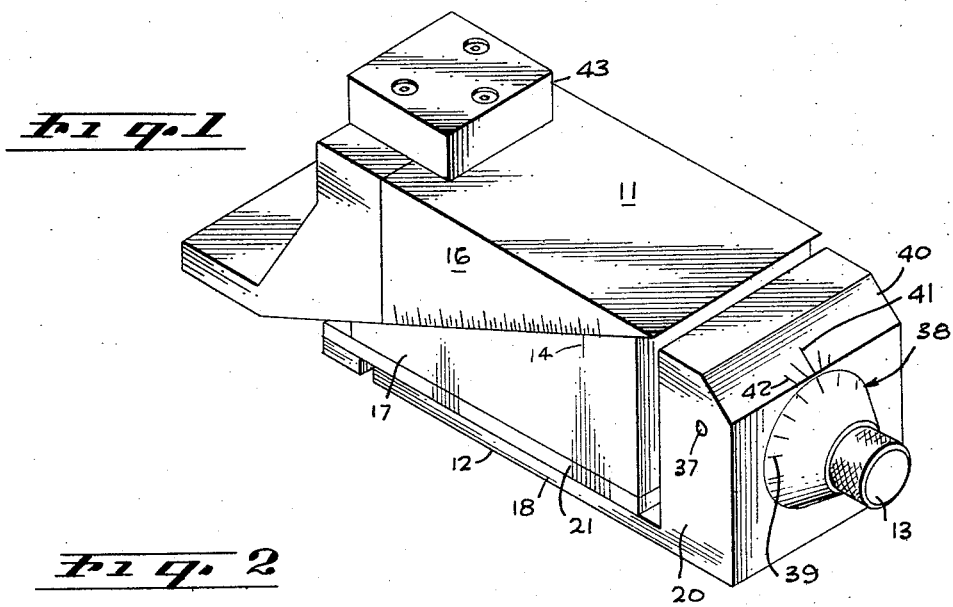
FIGURE 1 is an isometric view of my variable height gauge.

The top surface 11 of my expandable gauge varies its distance with respect to the bottom surface 12 upon rotation of the knob 13. Gauges of this type may of course be made in different sizes, each size being capable of varying its height within fixed limits; for example, one size may have a minimum distance of two inches between the top surface 11 and the bottom surface 12, this distance being expandable to, say, two and one-half inches upon rotation of the knob 13 in a clockwise direction. During this rotation, the indicator 14 will move from its minimum indication at the right hand of the scale 15 to various other indications as the indicator traverses the calibrated scale.

In order to accomplish such variation in the distance between the top surface 11 and the bottom surface 12 and to effect the traversal of the calibrated scale 15 by the indicator 14, I place the scale 15 on the vertical side of a wedge-shaped member 16 that is constrained for vertical movement only, and I place the indicator 14 upon a second wedge-shaped member 17 that is guided for horizontal movement only, the indicator 14 being on a vertical surface that is in the same plane as the vertical surface upon which the calibrated scale 15 is inscribed or otherwise provided.

Members 16 and 17 might be considered as complementary halves of a rectangular block divided diagonally.

Figure 2:
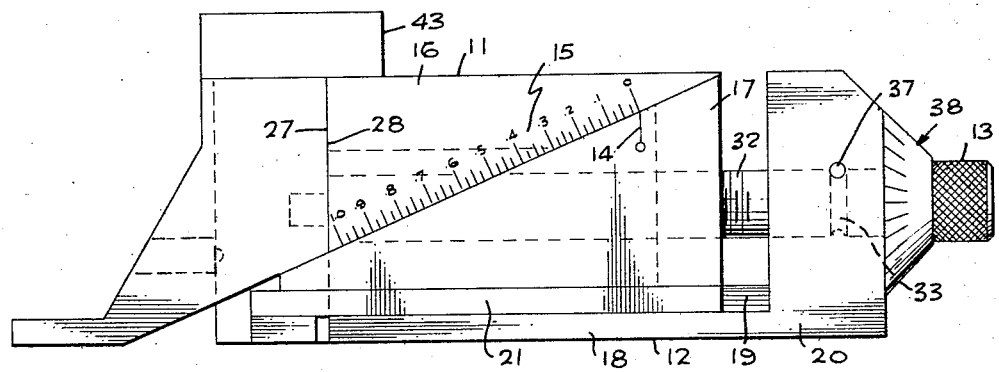
FIG. 2 is a side elevation of the gauge showing the top surface in its closest position to the bottom surface and showing also a calibrated scale that is traversed by an indicator as the gauge expands or contracts.

These complementary members are accordingly wedge-shaped, and it will be clear that because of their contacting inclined surfaces, the lower of these two members 17 may act as a wedge or cam under the member 16 to raise it vertically as member 17 moves translationally to the left from the position shown in FIG. 2.

In order to constrain the member 17 against any but rectilinear movement with respect to the base 12, member 17 is suitably keyed to the base. This is done by means of the dovetailed construction most clearly shown in FIG. 7. Here it will be seen that the top portion 19 of the base 18 is shaped like an inverted truncated pyramid. In the presently preferred embodiment, this configuration extends all the way from the upright 20, which is integral with the base 18, to the opposite end of the base, as revealed in FIGS. 2, 4, 5 and 6.

Two elongated members 21 and 21' extend longitudinally along the bottom of member 17, and they are attached thereto by any appropriate means such as the screws 22 and 23. The outside edges of members 21 and 21', in the preferred embodiment of my invention, are in line with the outside vertical surfaces of member 17, and their opposite inner edges are sloped to conform to the sloping opposite sides of the keying portion 19 of the base 18. The members or portions 21 or 21' may of course be made integrally with member 17, but the structure here illustrated is a form that satisfactorily meets the mechanical requirements.

Figure 3:
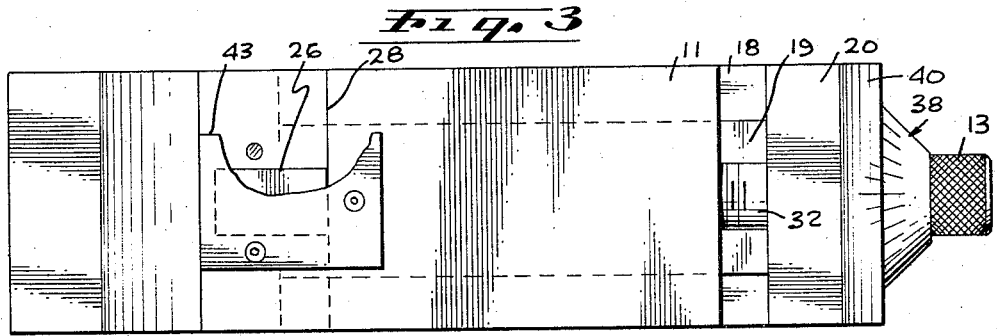
FIG. 3 is a plan view, partly broken away, of the device of FIGS. 1 and 2.

Before discussing the means for imparting horizontal motion to member 17, the general shape of this member will be described, as this shape is related to its manner of cooperation with member 16. Member 17 is bifurcated by a recess 25 (FIGS. 5, 6 and 7). The outer ends of member 17, whose top surfaces are of course sloped to conform to the angle of the bottom surfaces of member 16, straddle a post 26 that is appropriately secured to the base 18. This post, which acts as a vertical guide for member 16, is straddled by the outer ends of member 17 so that these ends may bypass the post. Member 16 may be formed of two or more parts such as part 27 that forms the top and side portions and the end part 28 that is recessed to fit the post 26, as shown in FIGS. 3 and 6. When part 28 is not made integral with part 27, it may be joined thereto by any appropriate means such as the screws 29. Part 27 of member 11 abuts against the post 26 and the rear part 28 of member 11 is attached to the forward part 27 by any convenient means such as the screws 29, previously mentioned.

It will be clear from an examination of FIGS. 2 and 3 that if member 16 moves vertically from the position shown in FIG. 2, the post 26 will guide it in a straight vertical path.

In order to remove play between the post and the parts of member 16 that encircle it, the post 26 is provided with a longitudinal slot 30 in its left side, and part 28 carries a spring loaded plunger or Vlier 31 that presses against the bottom of the slot 30 to force element 28 to the left and thus draw element 27 of member 16 into close engagement with the post 26. Plunger 31 also serves the additional purpose of limiting the upward travel of member 16 by engaging shoulder 45 at the upper end of slot 30, thus preventing member 16 from being moved off the top of post 26.

The recess in member 28 that receives the guide post 26 is covered at the top by a member 43 to limit the downward movement of member 11 and also to keep dust out of the recess that traverses the post.

Member 17 is moved translationally along the base member 18 by means of a rotatable screw 32 now to be described. The external end of this screw is journalled in the upright 20 which is an integral part of the base 18. The screw 32 is restrained against longitudinal movement by a pin 37 that fits in an annular groove 33 in the periphery of the screw. The opposite end 34 of the screw 32 is appropriately journalled in the recess 35 in the post 26. The screw 32 is externally threaded between its journalled ends and the male threads of this screw are in threaded engagement with female threads 36 in the right end wall 24 of member 17. If the threads on screw 32 are right-handed, member 17 will move toward the upright 20 upon clockwise rotation of the knob 13, and it will of course move away from the upright 20 upon counter-clockwise rotation of the knob 13.

I provide a dial 38 on the external end of the screw 32 that protrudes through the upright element 20. In the preferred embodiment of my invention, this dial is given an inclined face, the dial thus having a generally cone-shaped configuration.

In the conventional micrometer, the spindle moves one-half inch for each twenty turns of the micrometer screw, and twenty-five calibrating lines are provided on the thimble so that the movement of the thimble from one calibrating line to the next represents .001 inch of travel of the spindle. Inasmuch as mechanics and tool makers and other artisans customarily associate the distance between calibrating lines on the thimble of a micrometer with a rectilinear movement of one thousandths of an inch, I prefer that my expandable gauge be so constructed that the upper surface will move one one-thousandths of an inch for each division that may be provided on the dial 38. This situation may be effected by so shaping the wedge-shaped members that the included angle between the upper and lower surfaces of each wedge-shaped member will be 23 degrees, 34 minutes and 52 seconds and by providing threads on the screw 32 that will have a pitch of .05728125 and by calibrating the dial with 25 divisions to correspond to the usual divisions of a micrometer thimble.

The sine of the included angle between the upper and lower surfaces of each of the wedge-shaped members is exactly .4000, and when the screw has the prescribed pitch it will have 17.46 threads per inch. When the gauge is so constructed, the indicating line 14 on the block 17 will move one and one-quarter inches along the calibrated scale 15 as the upper surface 11 of block 16 moves vertically one-half inch.

In the preferred embodiment of my invention, the memebber 20 is provided with a front inclined face 40 having the same slope as the dial 38. This sloping surface 40 bears an indicating line 41 that cooperates with the calibrations 39 on the dial 38. When the dial moves from one calibrating line to the next with respect to the line 41, the upper surface 11 of the expandable block will of course move vertically one one-thousandths of an inch, but to measure with accuracy still smaller increments, I provide vernier calibrating lines 42 on opposite sides of the central indicating line 41 on the surface 40. These vernier lines are used in the conventional manner with which those skilled in the mechanical arts are familiar.

If it is desired that the surface 11 of block 16 should rise in response to clockwise rotation of knob 13, this may of course be arranged merely by providing the screw 32 and the block 20 with left-hand threads.

In order to make sure that the upper wedge-shaped member 16 that bears the top surface 11 of the device moves down smoothly whenever the lower wedge-shaped member 17 is withdrawn from under 16 as the knob 13 is rotated clockwise, I suitably mount magnets 44 on the inclined surface of one of the wedge-shaped members, and provide a magnetically sensitive surface for the contacting inclined side of the other wedge-shaped member. The magnets may be mounted directly on the surface of the member to which they are attached, or they may be recessed or embedded. If the magnets extend beyond the general plane of the sloping surface of the wedge-shaped member to which they are attached, the contacting surface of the mating wedge-shaped member may be suitably recessed to compensate.

Various modifications may of course be made in the structure hereinbefore described, and various elements may be omitted and replaced by others performing the same function or the same function plus one or more additional functions. Moreover, parts may be combined or divided, reversed or transposed without departing from the broad spirit of the invention as succinctly set forth in the appended claims.

The inventor claims:

1. A variable height gauge including: a supporting structure comprising an L-shaped member having a horizontal base and a vertical upright that is integral therewith; a first wedge-shaped member supported on said base and slidably keyed thereto for rectilinear movement thereover, said first wedge-shaped member having an upper surface that is disposed at an acute angle with respect to said base and a vertical surface that is perpendicular to the lower surface of said base; a second wedge-shaped member having (a) a lower surface supported on the upper surface of said first member, (b) a vertical surface in substantially the same plane as the vertical surface of said first member and extending substantially thereto, and (c) an upper surface disposed at an acute angle with respect to said lower surface, the upper surface of said second member being parallel to the lower surface of said base; calibrations on one of said vertical surfaces extending substantially to the other vertical surface; indicating means on the latter vertical surface at least substantially reaching said calibrations; manually operable means comprising an elongated element disposed parallel to said base and journaled near one of the element's ends in said upright for rotary movement with respect thereto, said element having a section that is threaded through said first member to move said first member rectilinearly of said screw and base beneath said second member upon rotation of said screw; and means guiding said second member for vertical movement with respect to said base in response to rectilinear movement of said first member, said guiding means comprising a vertical post secured to the upper surface of said base intermediate its two sides, and said second member having an opening extending from its lower surface to its upper surface to permit the post to pass therethrough, said post and opening being mutually keyed to prevent all relative movement of said second member with respect to said post excepting to and from said base; said indicating means traversing said calibrations as said second member moves vertically.

2. A variable height gauge including: a supporting structure comprising an L-shaped member having a horizontal base and a vertical upright that is integral therewith; a first wedge-shaped member supported on said base and slidably keyed thereto for rectilinear movement thereover, said first wedge-shaped member having an upper surface that is disposed at an acute angle with respect to said base and a vertical surface that is perpendicular to the lower surface of said base; a second wedge-shaped member having (a) a lower surface supported on the upper surface of said first member, (b) a vertical surface in substantially the same plane as the vertical surface of said first member and extending substantially thereto, and (c) an upper surface disposed at an acute angle with respect to said lower surface, the upper surface of said second member being parallel to the lower surface of said base; calibrations on one of said vertical surfaces extending substantially to the other vertical surface; indicating means on the latter vertical surface at least substantially reaching said calibrations; manually operable means comprising an elongated element disposed parallel to said base and journaled near one of the element's ends in said upright for rotary movement with respect thereto, said element having a section that is threaded through said first member to move said first member rectilinearly of said screw and base beneath said second member upon rotation of said screw; and means guiding said second member for vertical movement with respect to said base in response to rectilinear movement of said first member, said guiding means comprising a post secured to the upper surface of said base intermediate its two sides, and said second member having an opening extending from its lower surface to its upper surface to permit the post to pass therethrough, said post and opening being mutually keyed to prevent all relative movement of said second member with respect to said post excepting to and from said base; said second member having a plunger extending into said opening from the side of the second member that adjoins the vertical surface of the post that faces away from the upright, the plunger being spring-biased against the post to draw the side of the opening opposite from the plunger against the post; said indicating means traversing said calibrations as said second member moves vertically.

3. A variable height gauge including: a supporting structure comprising an L-shaped member having a horizontal base and a vertical upright that is integral therewith; a first wedge-shaped member supported on said base and slidably keyed thereto for rectilinear movement thereover, said first wedge-shaped member having an upper surface that is disposed at an acute angle with respect to said base and a vertical surface that is perpendicular to the lower surface of said base; a second wedge-shaped member having (a) a lower surface supported on the upper surface of said first member, (b) a vertical surface in substantially the same plane as the vertical surface of said first member and extending substantially thereto, and (c) an upper surface disposed at an acute angle with respect to said lower surface, the upper surface of said second member being parallel to the lower surface of said base; calibrations on one of said vertical surfaces extending substantially to the other vertical surface; indicating means on the latter vertical surface at least substantially reaching said calibrations; manually operable means comprising an elongated element disposed parallel to said base and journaled near one of the element's ends in said upright for rotary movement with respect thereto, said element having a section that is threaded through said first member to move said first member rectilinearly of said screw and base beneath said second member upon rotation of said screw; and means guiding said second member for vertical movement with respect to said base in response to rectilinear movement of said first member, said guiding means comprising a post secured to the upper surface of said base intermediate its two sides, and said second member having an opening extending from its lower surface to its upper surface to permit the post to pass therethrough, said post and opening being mutually keyed to prevent all relative movement of said second member with respect to said post excepting to and from said base; the side of the post that faces away from the upright having a vertical slot the upper end of which is spaced from the top of the post, and in which the portion of the second member that rides the surface having said slot is provided with a plunger that is spring biased into said slot to draw the side of the opening opposite from the plunger against the post, the upper end of said slot acting to limit the upward movement of said second member by abutting against the side of the plunger; said indicating means traversing said calibrations as said second member moves vertically.

4. A variable height gauge including: a supporting structure comprising an L-shaped member having a horizontal base and a vertical upright that is integral therewith; a first wedge-shaped member supported on said base and slidably keyed thereto for rectilinear movement thereover, said first wedge-shaped member having an upper surface that is disposed at an acute angle with respect to said base and a vertical surface that is perpendicular to the lower surface of said base; a second wedge-shaped member having (a) a lower surface supported on the upper surface of said first member, (b) a vertical surface in substantially the same plane as the vertical surface of said first member and extending substantially thereto, and (c) an upper surface disposed at an acute angle with respect to said lower surface, the upper surface of said second member being parallel to the lower surface of said base; calibrations on one of said vertical surfaces extending substantially to the other vertical surface; indicating means on the latter vertical surface at least substantially reaching said calibrations; manually operable means comprising an elongated element disposed parallel to said base and journaled near one of the element's ends in said upright for rotary movement with respect thereto, said element having a section that is threaded through said first member to move said first member rectilinearly of said screw and base beneath said second member upon rotation of said screw; and means guiding said second member for vertical movement with respect to said base in response to rectilinear movement of said first member, said guiding means comprising a post secured to the upper surface of said base intermediate its two sides, and said second member having an opening extending from its lower surface to its upper surface to permit the post to pass therethrough, said post and opening being mutually keyed to prevent all relative movement of said second member with respect to said post excepting to and from said base; the end of said element remote from said upright being journaled in said post.

5. A variable height gauge including: a supporting structure comprising an L-shaped member having a horizontal base and a vertical upright that is integral therewith; a first wedge-shaped member supported on said base and slidably keyed thereto for rectilinear movement thereover, said first wedge-shaped member having an upper surface that is disposed at an acute angle with respect to said base and a vertical surface that is perpendicular to the lower surface of said base; a second wedge-shaped member having (a) a lower surface supported on the upper surface of said first member, (b) a vertical surface in substantially the same plane as the vertical surface of said first member and extending substantially thereto, and (c) an upper surface disposed at an acute angle with respect to said lower surface, the upper surface of said second member being parallel to the lower surface of said base; calibrations on one of said vertical surfaces extending substantially to the other vertical surface; indicating means on the latter vertical surface at least substantially reaching said calibrations; manually operable means comprising an elongated element disposed parallel to said base and journaled near one of the element's ends in said upright for rotary movement with respect thereto, said element having a section that is threaded through said first member to move said first member rectilinearly of said screw and base beneath said second member upon rotation of said screw; and means guiding said second member for vertical movement with respect to said base in response to rectilinear movement of said first member, said guiding means comprising a post secured to the upper surface of said base intermediate its two sides, and said second member having an opening extending from its lower surface to its upper surface to permit the post to pass therethrough, said post and opening being mutually keyed to prevent all relative movement of said second member with respect to said post excepting to and from said base; said indicating means traversing said calibrations as said second member moves vertically; and a cover plate secured to said second member over said opening to exclude dust therefrom and to limit the downward movement of said second member.

References Cited by the Examiner

UNITED STATES PATENTS

| 1,228,791 | 6/1917 | Laubscher | 33—162 |
| 1,511,934 | 10/1924 | Bath | 33—178 |
| 1,639,580 | 8/1927 | Thompson. | |
| 2,330,412 | 9/1943 | Dierking | 33—162 |
| 2,642,669 | 6/1953 | Ernst | 33—164 |

FOREIGN PATENTS 567,373  2/1945  Great Britain.

ISAAC LISANN, *Primary Examiner.*